United States Patent [19]

Plesser et al.

[11] Patent Number: 4,903,823
[45] Date of Patent: Feb. 27, 1990

[54] SPATIAL CONVEYOR FOR TRANSFERRING NEWSPAPERS, BOOKS AND MAGAZINES

[76] Inventors: Dmitry A. Plesser, ulitsa Seleznevskaya, 30, korpus 3, kv. 14; Grigory A. Radutsky, ulitsa Pervomaiskaua, 66, kv. 45; Sergei K. Gutov, ulitsa Ramenki, 7, korpus 1, kv. 76, all of Moscow, U.S.S.R.

[21] Appl. No.: 239,952

[22] PCT Filed: Sep. 30, 1987

[86] PCT No.: PCT/SU87/00109
   § 371 Date: May 27, 1988
   § 102(e) Date: May 27, 1988

[87] PCT Pub. No.: WO88/02337
   PCT Pub. Date: Apr. 7, 1988

[30] Foreign Application Priority Data

Oct. 1, 1986 [SU] U.S.S.R. ............................ 4122339

[51] Int. Cl.$^4$ ............................................. B65G 39/20
[52] U.S. Cl. ........................................ 198/845; 198/712
[58] Field of Search ............... 198/704, 712, 838, 845, 198/852; 104/172.5

[56] References Cited

U.S. PATENT DOCUMENTS

| | | | |
|---|---|---|---|
| 3,895,707 | 7/1975 | Anikanov et al. | 198/204 |
| 3,934,709 | 1/1976 | Anikanov et al. | 198/704 |
| 4,746,007 | 5/1988 | Houseman | 198/852 |
| 4,838,410 | 6/1989 | Gough | 198/712 |

FOREIGN PATENT DOCUMENTS

| | | | |
|---|---|---|---|
| 893022 | 10/1953 | Fed. Rep. of Germany | 198/845 |
| 2027658 | 2/1980 | United Kingdom | 198/852 |

*Primary Examiner*—Joseph E. Valenza
*Attorney, Agent, or Firm*—Lilling and Greenspan

[57] ABSTRACT

A spatial conveyor includes a draw member (1) running on spherical supports (4) along a trackway. The draw member (1) consists of links each of which comprises interconnected plate cheeks (5, 6) having cavities. Some of the cavities accommodate elements connecting the adjacent plate cheeks (5, 6), whereas the others accommodate the spherical supports (4) running along the trackway made in the form of a plurality of support elements (11, 12, 13, 14) disposed equidistantly and uniformly relative to the longitudinal axis of the conveyor and making up in a section a closed regular polygon.

2 Claims, 2 Drawing Sheets

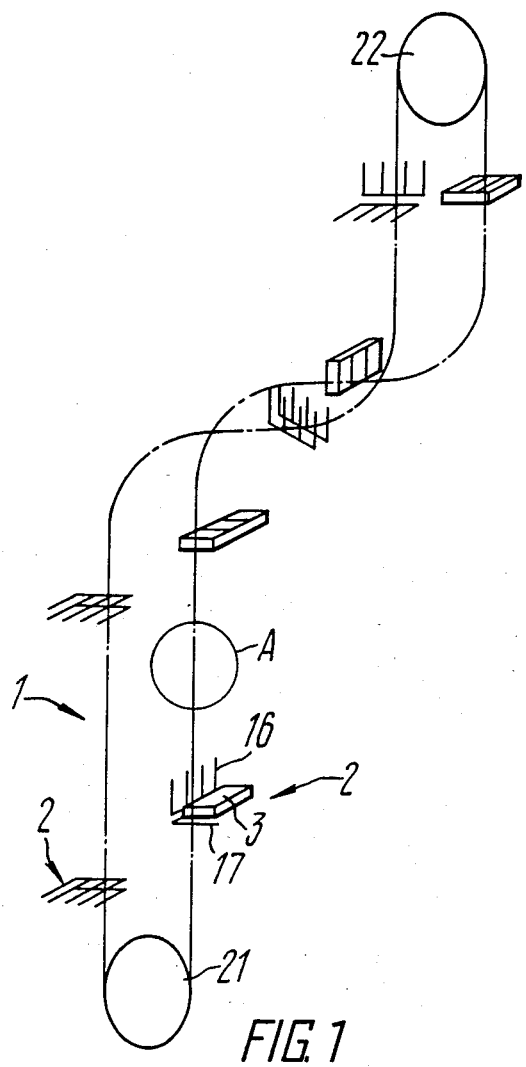
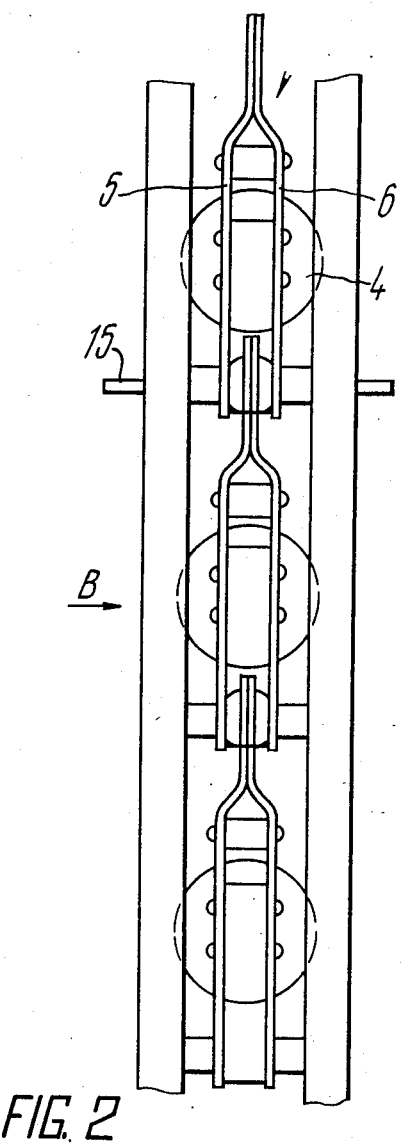
FIG. 1
FIG. 2

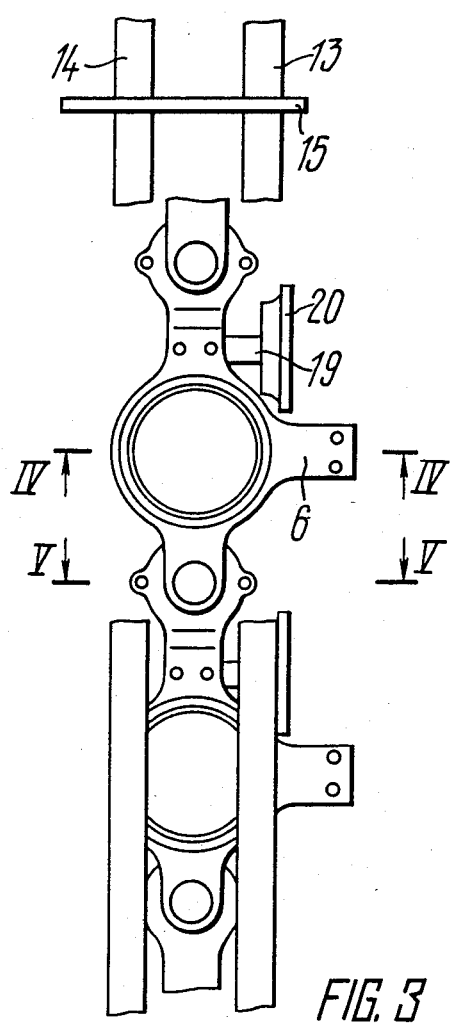
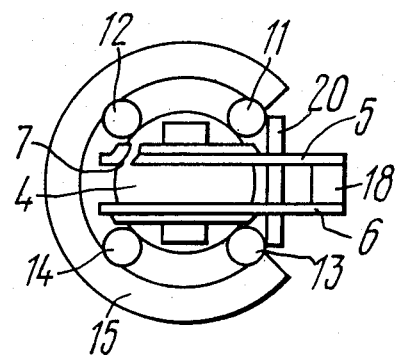
FIG. 4
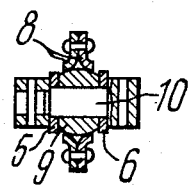
FIG. 5
FIG. 3

SPATIAL CONVEYOR FOR TRANSFERRING NEWSPAPERS, BOOKS AND MAGAZINES

BACKGROUND OF THE INVENTION

1. Field of the Invention

The invention relates to conveyors for receiving printed matter of newspaper type from printing machines and for transferring thereof to devices for further handling, i.e. for stacking, packing thereof, and more particularly to spatial conveyors for carrying newspapers, books and magazines.

2. Description of the Prior Art

Known in the art is a conveyor to transfer newspapers from printing machines to devices for handling thereof, which comprises an endless chain made up of carriages hingedly connected to each other and moved on wheels along a trackway (CH,A, 592,562).

In the known conveyor the trackway is shaped as a C-section channel rectangular in cross-section and having a groove in one of its sides extending along the longitudinal axis of the trackway. Inside this channel there move chain carriages each of which is provided with three wheels. One wheel is introduced into the groove of the C-section trackway and interacts by its rim with edges of the groove. Two other wheels are located insdie the C-section trackway, one on either side of the first wheel, and connected by a common axle perpendicular to the first wheel axle.

The known conveyor provides for spatial movement of newspapers from the printing machines to the devices for handling thereof, but it features high specific metal content as its trackway is made in the form of a C-section and is labour-consuming in manufacture as the spatial bendings of the C-section is a complicated operation.

Also known in the art is a conveyor to transfer newspapers from printing machines to devices for handling thereof in which a trackway has a V-shaped cross section throughout the length thereof whereas a draw member comprising hingedly connected carriages moves along the trackway on spherical supports (DE,C, 1,217,270).

Though it is easier to manufacture the V-section bent in space than that spaced as C-section however, such section also features high specific metal content and is difficult to manufacture.

Moreover, connecting the draw member carriages by means of pivoting bearings complicates the assembly of the draw member as an outer ring of the bearing is pressed in the carriage and makes the repair thereof more difficult if the necessity arises to replace the bearing or the carriage body. This is due to a possible damage to the carriage body when the bearing is pressed out.

SUMMARY OF THE INVENTION

The invention seeks to provide a spatial conveyor having a draw member and a trackway so designed as to reduce amount of metal per structure and to simplify the design and process of manufacture of the conveyor as a whole.

This is achieved by a spatial conveyor comprising a draw member having load-carrying means and moving on spherical supports along a trackway. According to the invention the draw member consists of links each of which comprises interconnected plate cheeks having cavities with spherical surfaces, some of the cavities accommodating elements connecting the adjacent plate cheeks, the others accommodating the spherical bearings moving along the trackway made in the form of a plurality of support elements disposed equidistantly and uniformly with respect to the longitudinal axis of the conveyor over the entire length thereof and forming a closed regular pylygon in a section perpendicular to the axis of the conveyor.

Making the draw member in the form of plate cheeks with cavities having spherical surfaces simplifies the design of the draw member owing to replacement of two wheels and attachment fitting thereof in each carriage by one spherical support, and also simplifies the assembly and disassembly procedures due to replacement of the pivoting bearing in each carriage by a connecting element.

It is expedient that the trackway be made in the form of uniformly disposed support elements forming a closed regular polygon in the cross section which allows the amount of metal consumed for the trackway to be reduced, the manufacturing process to be simplified and maintenance thereof to be made easier since such trackway is open and accessible for cleaning from contaminants.

The element connecting the adjacent plate cheek is preferably made in the form of a ball insert whose spherical surface is congruent with the spherical surface of the cavity in which the ball insert is located.

An embodiment of the connecting element in the form of a ball insert with the spherical surface congruent with the spherical surface of the cavities of the plate cheeks provides for a simple and reliable connection of the draw member links.

BRIEF DESCRIPTION OF THE DRAWINGS

The invention will further be described, by way of example, with reference to the accompanying drawings wherein:

FIG. 1 schematically shows a conveyor according to the invention.

FIG. 2 shows a detail A of FIG. 1;

FIG. 3 is a view in the direction of arrow B of FIG. 2;

FIG. 4 is a section on line IV—IV of FIG. 3, partly cut away; and

FIG. 5 is a section on line V—V of FIG. 3.

DESCRIPTION OF THE PREFERRED EMBODIMENT

A conveyor of the invention comprises a draw member 1 (FIG. 1) having load-carrying means 2 for printed matter 3, such as newspapers, books and magazines, and moved on spherical supports 4 (FIG. 2) along a trackway. The draw member 1 incorporates links each comprising interconnected plate cheeks 5 and 6 having cavities with spherical surfaces 7 (FIG. 4) intended to accommodate the spherical supports 4 and having also cavities with spherical surfaces 8 (FIG. 5) intended to accommodate connecting elements in the form of ball inserts 9 whose spherical surfaces are congruent with the spherical surface 8. Each insert 9 has a hole to receive an axle 10 intended for connection with the plate cheeks 5, 6 of the adjacent link.

The spherical support 4 (FIG. 4) moves along the trackway made in the form of a plurality of support elements 11, 12, 13, 14 disposed equidistantly and uniformly with respect to the longitudinal axis of the conveyor along the entire length thereof and making up in the section perpendicular to the axis of the conveyor a closed regular polygon as shown in FIG. 4. The support elements 11, 12, 13, 14 are interconnected for rigidity by shakles 15 at regular intervals over the length of the trackway.

The load-carrying means 2 (FIG. 1) comprise flaps 16 and 17 to be opened for loading and unloading. The load-carrying means 2 are attached to support platform 18 (FIG. 4) secured between the cheeks 5 and 6 of the draw member links.

Between the cheeks 5 and 6 of each link of the draw member there is arranged an axle 19 (FIG. 3) with a roller 20 interacting with the support elements 11 and 13.

The draw member 1 is driven by means of sprockets 21 and 22 cooperating with the axles 10 of the inserts 9.

The conveyor of the invention operates in the following way.

With the sprockets 21 and 22 rotating the draw member 1 runs on the spherical supports 4 along the support elements 11–14. The rollers 20 cooperate with the support elements 11, 13 ensuring a stable position of the cheeks 5 and 6 relative to said support elements. With the support elements 11–14 of the trackway bent in space the cheeks 5 and 6 of the adjacent links turn with respect to each other due to the ball insert 9 arranged therebetween.

The flaps 16 and 17 of the load carrying means 2 in the loading area are opened to take in the product, e.g. newspapers, to be transported, then they are closed and the newspapers in such a state are conveyed to the unloading position.

The spatial conveyor is widely used for transporting newspapers, books and magazines from printing machines to the devices for handling thereof, i.e. for packing, binding and so on.

We claim:

1. A spatial conveyor for transferring newspapers, books and magazines or the like, comprising a trackway made in the form of a plurality of support elements (11, 12, 13, 14) disposed equidistantly and uniformly relative to the longitudinal axis of the conveyor along the entire length thereof and making up a closed regular polygon in a section perpendicular to the axis of the conveyor; a draw member (1) having load-carrying means (2) mounted for movement on spherical supports (4) along said trackway, said draw member (1) consisting of links each of which comprises interconnected plate cheeks (5,6) having cavities with spherical surfaces (7,8), some of said cavities (8) accommodating connecting elements connecting the adjacent plate cheeks, while the other cavities (7) accommodate the spherical supports (4) running over said trackway.

2. A conveyor according to claim 1, wherein each connecting element connecting the adjacent plate cheeks is made in the form of a ball insert (9) whose spherical surface is congruent with the spherical surface of the cavity (8) accommodating said ball insert.

* * * * *